United States Patent [19]
Cady et al.

[11] 4,381,810
[45] May 3, 1983

[54] TIRE WITH DUAL TREAD COMPOUND

[75] Inventors: John M. Cady, Munroe Falls; William E. Egan, Tallmadge, both of Ohio

[73] Assignee: The Goodyear Tire & Rubber Company, Akron, Ohio

[21] Appl. No.: 266,554

[22] Filed: May 22, 1981

[51] Int. Cl.³ .................. B60C 11/00; B60C 9/00; B60C 15/00
[52] U.S. Cl. .................. 152/209 R; 152/330 R; 152/354 R; 152/361 R; 152/374; 523/155; 523/156
[58] Field of Search .......... 192/209 R, 209 A, 209 B, 192/209 D, 209 NT, 209 WT, 374, 330 R, 360, 354 R, 361 R, 361 DM, 362 R; 523/150, 152, 155, 156

[56] References Cited

U.S. PATENT DOCUMENTS

| | | | |
|---|---|---|---|
| 2,445,725 | 7/1948 | Walker | 152/374 |
| 3,830,275 | 8/1974 | Russell | 152/330 R |
| 4,224,197 | 9/1980 | Ueda et al. | 152/209 R |
| 4,281,703 | 8/1981 | Ahmad | 152/209 R |

FOREIGN PATENT DOCUMENTS

| | | | |
|---|---|---|---|
| 1255952 | 12/1971 | United Kingdom | 152/360 |
| 2058687 | 4/1981 | United Kingdom | 152/209 R |

*Primary Examiner*—Edward C. Kimlin
*Assistant Examiner*—Thomas Bokan
*Attorney, Agent, or Firm*—H. C. Young, Jr.

[57] ABSTRACT

A tire which has an outer and an inner layer of compound in the non-skid portion of the tread thereof. The outer layer is composed of a lower rolling resistance compound than the inner layer is composed. The inner layer is composed of a compound which provides better traction than the compound of the outer layer provides.

1 Claim, 1 Drawing Figure

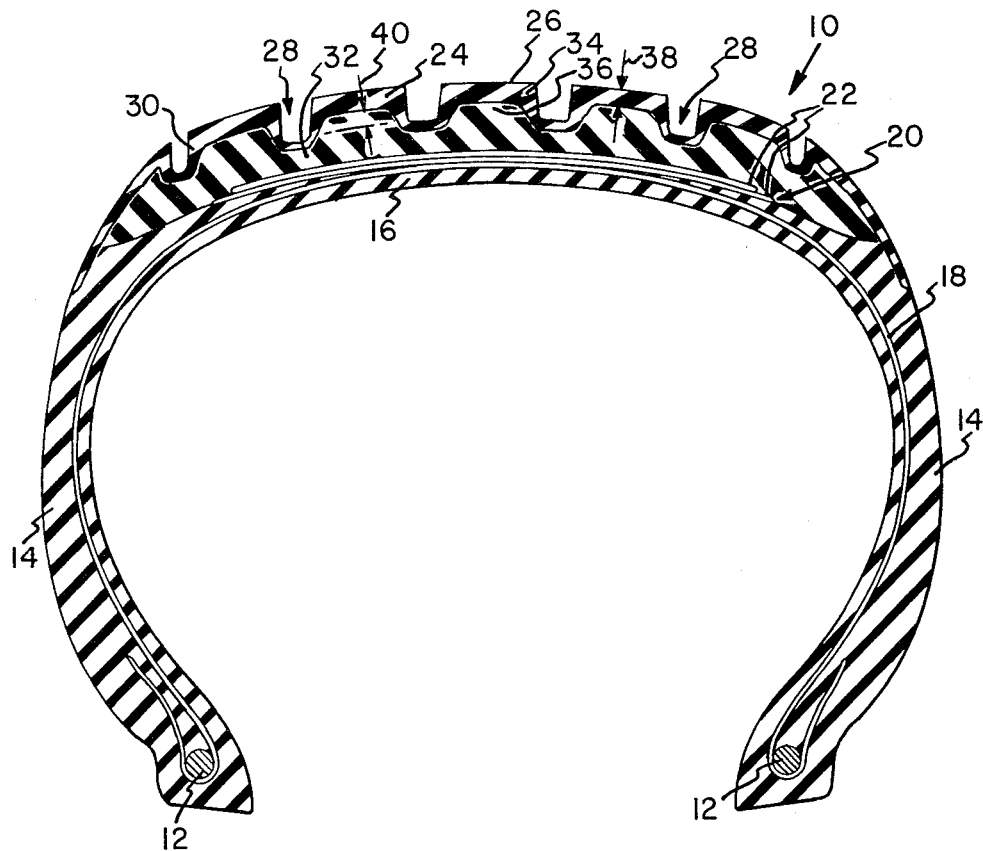

TIRE WITH DUAL TREAD COMPOUND

The foregoing abstract is not to be taken as limiting the invention of this application, and in order to understand the full nature and extent of the technical disclosure of this application, reference must be made to the accompanying drawing and the following detailed description.

This invention relates to tires and, more particularly, it relates to a tire having a dual tread compound in the non-skid portion of the tread thereof.

Tires have commonly been constructed by applying an outer homogenous tread stock over a supporting carcass structure and vulcanizing the resulting composite structure. An outer matrix of grooves is molded or otherwise provided in the outer portions of this homogenous tread stock to provide traction as well as other desirable characteristics.

It is commonly known in the tire industry that certain tread compounds provide better traction than others. It is also commonly known that certain tread compounds provide better rolling resistance than others. Although a tire which has both low rolling resistance and a maximum amount of traction is desirable, a tread compound which provides good rolling resistance in a tire may not generally provide a maximum amount of traction, and a tread compound which provides a maximum amount of traction may not generally provide as low of rolling resistance as may be desired.

It is an object of the present invention to provide a tire which has both low rolling resistance and a high amount of traction throughout the tread life. Other objects will become apparent hereinafter.

To acquaint persons skilled in the arts most closely related to the present invention, certain preferred embodiments thereof illustrating a best mode now contemplated for putting the invention into practice are described herein by and with reference to the annexed drawings forming a part of the specification. The embodiments shown and described herein are illustrative and as will become apparent to those skilled in these arts can be modified in numerous ways within the spirit and scope of the invention defined in the claims hereof.

In the drawings:

The FIGURE is a sectional view of a tire embodying this invention.

There is shown in the FIGURE a tire 10 which is a toroidal-shaped structure provided with a pair of substantially inextensible circular beads 12, a pair of sidewalls 14 extending outwardly from the respective beads to a crown portion 16 which extends circumferentially about the tire 10. A conventional carcass structure 18 of either bias or radial tire cord fabric extends between the beads 12 to provide a reinforcing structure 20 for the tire 10. The reinforcing structure 20 may also include a belt or breaker structure such as two belts 22 disposed outwardly of the carcass structure 18 as shown in the FIGURE.

Disposed outwardly of the reinforcing structure 20 is a tread 24 which provides an outer surface 26 for engaging the surface of a road during use of the tire 10. A matrix of grooves 28 is provided in the outer portion of the tread such as the outer 0.37 inch (0.94 cm) of the tread of a typical passenger car tire so that the grooves extend to a tread depth of about 0.37 inch when the tire is new. Of course, during the use of a tire, the tread wears such that the groove depth becomes less and less until it reaches a point where the tire is said to be worn out. That portion of the tread 24 which contains the matrix of grooves 28 is referred to herein as the non-skid portion 30 of the tread.

A purpose of the non-skid portion 30 of the tread is to provide grooves and tread element edges for traction; that is, the grip or friction between a tire and the surface of the road to achieve movement along the road and to prevent the tire from skidding during braking or otherwise during use. This does not mean that skidding will not occur as long as a tire has a non-skid portion, but that a purpose of the non-skid portion with the groove matrix is to reduce as much as possible the amount of skidding that may occur. For example, it is commonly known that a tire may lose traction or skid on an ice-covered highway even though it has a non-skid portion.

A portion of the tread 24 referred to herein as the "undertread" is located between the non-skid portion 30 and the reinforcing structure 20. The undertread 32 is distinguished from the non-skid portion 30 in that the grooves of the groove matrix 28 do not extend into the undertread 32 and the non-skid portion 30 of the tread does not extend past the bottoms of the grooves of the groove matrix 28. The undertread 32 may have a depth of perhaps 0.19 inch (0.48 cm) for a passenger car tire having a non-skid depth of 0.37 inch (0.94 cm); that is, the distance between the bottom of the grooves of the groove matrix 28 and the reinforcing structure 20 is 0.19 inch.

In tires which have an homogenous tread compound throughout the non-skid portion of the tread, as the tire tread of such a tire wears and the groove depth decreases, the traction usually decreases to the point where the tread provides significantly less traction when all of the non-skid portion has been worn away. In addition, certain tread compounds provide greater traction than other tread compounds. Therefore, the traction of a tire at any particular time during its use is dependent upon how much the tire tread has worn and the type of compound in the non-skid portion at the ground-engaging surface thereof at that particular time.

On the other hand, good traction compounds generally do not provide as low of rolling resistance as may be desired. Rolling resistance refers to the resistance of a tire to free rolling. As the rolling resistance of a tire increases, additional energy is required to cause the tire to roll thereby resulting in a greater consumption of gasoline in driving the automobile. Therefore, tires which provide low rolling resistance are desirable for the purpose of conserving energy.

In a tire having a non-skid portion composed of an homogenous tread compound throughout, as the tire wears during use and the depth of the grooves decreases, the rolling resistance of the tire usually decreases significantly, thus improving. In addition, there are certain tread compounds which provide lower rolling resistance than other tread compounds, and a tread compound which provides desirably low rolling resistance generally does not provide as much traction as may be desired.

Therefore, in order to provide, in accordance with this invention, a tire which has both low rolling resistance and good traction as the tire wears throughout the depth of the non-skid portion of the tread, the non-skid portion 30 of the tread is provided with a radially outer layer 34 of one elastomeric compound and a radially inner layer 36 of a different elastomeric compound. The term "radially" refers to a direction perpendicular to the rotational axis of a tire.

The outer layer 34 of the non-skid portion of the tread is composed of a lower rolling resistance compound than the compound of the inner layer 36 to reduce the naturally higher rolling resistance of the tire when it is new. Although the resulting decreased rolling resistance may be at the sacrifice of some traction when the tire is new, as previously stated, the traction of a tire is usually higher and it is therefore not as necessary to have a high traction compound at this stage of wear. As a result, the tire 10 has both low rolling resistance and good traction when it is new or relatively new.

In order to provide increased traction at the point when the traction of a tread usually drops in the latter stages of wear due to decreased non-skid depth, in accordance with an aspect of this invention the inner layer 36 of the non-skid portion is composed of a compound which provides better traction than the compound of the outer layer 34 provides. Although some rolling resistance which could have been provided by a low rolling resistance compound is sacrificed at this point when the tire is in its latter stages of wear, the result is increased traction which compensates for the otherwise usually low traction in a tire at this stage of wear and the rolling resistance remains low with the decreased depth of the non-skid portion. As a result, the tire 10 has both low rolling resistance and good traction in the latter stages of wear of the tire tread.

The thickness of each of the inner and outer layers 36 and 34 respectively can vary over a reasonably considerable range. The thickness of each of the inner and outer layers 36 and 34 respectively is preferably at least about 20 percent and not more than about 80 percent of the thickness of the non-skid portion 30. More preferably, the thickness of each of the inner and outer layers 36 and 34 respectively is at least 40 percent and not more than 60 percent of the thickness of the non-skid portion 30.

It should be noted that in a molded tire such as shown in the FIGURE, the outer layer compound is continuous across the tread 24 and therefore extends under each of the grooves 28 whereby parts of the undertread portion 32 are composed of outer layer compound as an inherent result of the rubber flow characteristics during the molding process. This would not necessarily result if the tire 10 were built by a different process such as if the layers of elastomeric material were built up on the tire and cured and then the grooves cut into the tread. Both continuous and discontinuous outer layers are therefore meant to come within the scope of the claims of this invention. Therefore, for the purposes of this specification and the claims, the thickness of each of the layers 34 and 36 is measured at a point which is located geometrically centrally between surrounding grooves, as illustrated at 38 for the outer layer 34 and at 40 for the inner layer 36. Although the undertread portion 32 may preferably be composed of a compound similar to the compound of the outer layer 34 having good rolling resistance properties, such a composition may require additional effort and expense in building tires without sufficient added benefit and from this standpoint, it is preferable that the undertread 32 be composed as shown in the FIGURE of a composition which is the same as the composition of the inner layer 36. Of course, since a tire should not be worn to the point where the undertread comes in contact with the ground, it is not considered necessary that the undertread 32 be composed of a good traction compound.

For the purposes of this specification and the claims, the rolling resistance of a tread compound is generally related to the percent of rebound of the compound wherein the higher the percentage of rebound, the lower the rolling resistance of the compound. The percent of rebound is determined by the pendulum rebound test according to ASTM D1054-79 in which a pendulum is released from a fixed height to strike an elastomeric block and then rebound. In accordance with a preferred embodiment of this invention, the compound of the outer layer 34 has a hot rebound according to ASTM D1054-79 equal to at least 75 percent while the hot rebound value for the inner layer 36 may be less than 65 percent.

No single evaluation of traction performance describes a tire's overall traction capabilities. Any measurement of tire traction is a measurement of a tire/road surface combination. Comparative tire traction performance testing is usually conducted by testing different tires on the same road surface under the same conditions such as is described by ASTM F403-74 or SAE J345a.

The traction performance of a tire tread is generally related to the coefficient of friction between the tire tread and a highway surface. For example, the kinetic coefficient of friction (as measured in laboratory tests such as described hereinafter) between a typical low rolling resistance compound and the following typical highway surfaces is as follows:

| dry asphalt | .73 |
| wet asphalt | .54 |
| dry concrete | .82 |
| wet concrete | .56 |

On the other hand, the kinetic coefficient of friction between a typical high traction compound and the same typical highway surfaces is as follows:

| dry asphalt | .75 (3 percent higher) |
| wet asphalt | .60 (11 percent higher) |
| dry concrete | .84 (2.5 percent higher) |
| wet concrete | .66 (18 percent higher) |

By wet asphalt or wet concrete is meant asphalt or concrete whose surface is covered with a film of water.

Although the test results do not necessarily agree or correlate with other slipperiness measuring equipment, the measurement by the British Pendulum Tester, according to ASTM E303-74 (Reapproved 1978), of the energy loss when a rubber slider edge is propelled over a test surface such as a wet concrete surface or a wet asphalt surface is a good measurement of the kinetic coefficient of friction between the rubber in the rubber slider and the test surface. To compare two compounds, rubber sliders may be prepared from the respective compounds and the energy loss of each slider as it is propelled over the same wet surface is measured and compared.

For the purposes of this specification and the claims, when it is stated that the compound of the inner layer 36 provides better traction than the compound of the outer layer 34 provides, it is meant that the kinetic coefficient of friction between the compound of the inner layer 36 and a wet concrete surface is greater than the kinetic coefficient of friction between the compound of the outer layer 34 and the same wet concrete surface. In accordance with a preferred embodiment of this invention, the kinetic coefficient of friction between the compound of the inner layer 36 and a wet concrete surface is at least 5 percent greater than the kinetic coefficient of friction between the compound of the outer layer 34 and the same wet concrete surface. In accordance with another preferred embodiment of this invention, the kinetic coefficient of friction between the compound of the inner layer 36 and a wet asphalt surface is at least 5 percent greater than the kinetic coefficient of friction between the compound of the outer layer 34 and the same wet asphalt surface.

Particular compounds for the inner and outer layers 36 and 34 respectively of the non-skid portion may be selected in accordance with this invention from compounds commonly known to those of ordinary skill in the art to which this invention pertains. There is such a wide variety of ingredients used in various tire compounds that the important mechanical properties for a given tire compound can usually be obtained from a number of different compositions. In addition, no tire compound is ever final but is always subject to change as test results and experience accumulate. However, in accordance with a preferred embodiment of this invention, a good low rolling resistance compound for use in the outer layer 34 includes, but is not limited to, any one of the three compounds provided in Table I, wherein all parts and percentages are by weight.

TABLE I

|  | Compd.A | Compd.B | Compd.C |
|---|---|---|---|
| Natural rubber (% of rubber) |  | 40–60 | 80–100 |
| Butadiene/styrene rubber (% of rubber) | 50–90 |  | 0–20 |
| Polybutadiene (% of rubber) | 10–50 | 40–60 |  |
| Carbon black (phr) | 60–80 | 40–60 | 40–60 |
| Processing oil (phr) | 25–45 | 10–30 | 2–5 |

In accordance with a preferred embodiment of this invention, a good traction compound for use in the inner layer 36 includes, but is not limited to, the compound provided in Table II, wherein all parts and percentages are by weight.

TABLE II

| Components | Compound |
|---|---|
| Butadiene/styrene rubber (% of rubber) | 60–90 |
| Polybutadiene (% of rubber) | 10–40 |
| Carbon black (phr) | 70–100 |
| Processing Oil (phr) | 30–55 |

Additional components including 1 to 3 phr waxes, 1 to 2 phr antioxidants, 1 to 3 phr accelerators, 2 to 8 phr zinc oxide, 1 to 3 phr sulfur, and 1 to 3 phr stearic acid may be added to the compounds of Tables I and II in accordance with principles of common knowledge to those of ordinary skill in the art to which this invention pertains.

Any type of suitable tread carbon black may be used in the compounds of the inner and outer layers 36 and 34 respectively including, but not limited to, those having ASTM designations N660, sometimes otherwise known as general purpose furnace black (GPF); N375, sometimes otherwise known as high structure, high abrasion furnace black (HS HAF); N110, sometimes otherwise known as super abrasion furnace black (SAF); and N299, sometimes otherwise known as general purpose thermal black (GPT).

The practice of this invention is further illustrated by reference to the example of a passenger tire non-skid portion rubber composition contained in Table III which is intended to be representative rather than restrictive of the scope of the invention. All parts and percentages are by weight.

TABLE III

| Components | Inner Layer 0.16 in. thick | Outer Layer 0.16 in. thick (0.4cm) |
|---|---|---|
| Butadiene/styrene rubber(% of rubber) | 90 | 70 |
| Polybutadiene (% of rubber) | 10 | 30 |
| Carbon black (GPT) (phr) | 80 | 65 |
| Processing oil (phr) | 40 | 32 |
| Waxes (phr) | 3 | 3 |
| Antioxidants (phr) | 1 | 1.15 |
| Accelerators (phr) | 1 | 1.15 |
| Zinc oxide (phr) | 3 | 4 |
| Sulfur (phr) | 1.35 | 1.75 |
| Stearic acid (phr) | 2 | 2 |

A tire non-skid portion 30 embodying this invention is particularly useful in an over-the-road tire where traction and rolling resistance are very desirable characteristics. For example, this invention is very useful in a passenger car tire wherein the thickness of the outer layer 34 is in the range of 0.1 to 0.2 inch (0.25 to 0.51 cm.) while the thickness of the inner layer 36 is in the range generally of 0.15 to 0.3 inch (0.38 to 0.76 cm.).

While certain representative embodiments and details have been shown for the purpose of illustrating the invention, it will be apparent to those skilled in the art that various changes and modifications may be made therein without departing from the spirit or scope of the invention.

What is claimed is:

1. A tire comprising a tread having a non-skid portion which includes a radially outer and a radially inner layer of elastomeric compound, said outer layer being composed of a lower rolling resistance compound than said inner layer, and said inner layer being composed of a compound which provides better traction than the compound of said outer layer, wherein
    A. the compound of said outer layer has a hot rebound of at least 75 and the compound of said inner layer has a hot rebound of less than 65 according to ASTMD1054-79,
    B. the kinetic coefficient of friction between the compound of said inner layer and a wet concrete surface is at least 5 percent greater than the kinetic coefficient of friction between the compound of said outer layer and the same wet concrete surface,
    C. the compound of said outer layer is composed of, based upon 100 parts by weight rubber, (1) about 50 to about 90 percent butadiene/styrene rubber, about 10 to about 50 percent polybutadiene, about 60 to about 80 phr carbon black, and about 25 to about 45 phr processing oil, (2) about 40 to about 60 percent natural rubber, about 40 to about 60 percent polybutadiene, about 40 to about 60 phr carbon black, and about 10 to about 30 phr processing oil, or (3) about 80 to 100 percent natural rubber, 0 to about 20 percent butadiene/styrene rubber, about 40 to about 60 phr carbon black, and about 2 to about 5 phr processing oil, and
    D. the compound of said inner layer is composed of, based upon 100 parts by weight rubber, about 60 to about 90 percent butadiene/styrene rubber, about 10 to about 40 percent polybutadiene, about 70 to about 100 phr carbon black, and about 30 to about 55 phr processing oil.

* * * * *